United States Patent [19]

Nyquist

[11] 3,773,156
[45] Nov. 20, 1973

[54] CLUTCH-BRAKE AND MOTOR CIRCUIT FOR ENGINE-DRIVEN IMPLEMENTS
[75] Inventor: Stephen E. Nyquist, Rockford, Ill.
[73] Assignee: Warner Electric Brake and Clutch Company, Beloit, Wis.
[22] Filed: July 24, 1972
[21] Appl. No.: 274,262

[52] U.S. Cl............... 192/.094, 192/.058, 192/.072, 74/850, 56/10.2
[51] Int. Cl............................................ F16d 67/06
[58] Field of Search................. 192/.072, .058, .094, 192/.09, .046; 74/846, 850; 56/10.2, DIG. 15

[56] References Cited
UNITED STATES PATENTS
2,822,667  2/1958  Drexel ............................... 192/.072
3,516,525  6/1970  Skaggs ............................... 192/.094
3,543,891  12/1970 Mathers ............................. 192/.094

Primary Examiner—Benjamin W. Wyche
Attorney—Wolfe, Hubbard, Leydig, Voit & Osann Ltd.

[57] ABSTRACT

A control circuit for use with an electrically actuated brake and clutch mechanism through which an implement is selectively driven by an engine, the clutch and brake mechanism being characterized by having a de-energized condition in which the implement is freewheeling and first and second energized conditions in which the implement is respectively clutched to said engine and braked to an immovable state. The control circuit includes a pair of switching devices which route energy to the clutch-and-brake mechanism from an electrical power source, one of the switching devices being in the form of a manual selector providing a choice between the first and second energized conditions of the mechanism, the other of the switching devices being controlled in accordance with the operating condition of the engine itself to (1) enable the selected one of the clutch or brake functions to occur by allowing energization of said clutch-and-brake mechanism during normal operating periods of the engine, and (2) for a short time subsequent to cessation of operation of the engine to maintain such energization so that the implement is either braked or clutched to a stopped condition. Clutching of the implement to the engine is prevented during initial start-up by an interlock mechanism which allows power to be applied to the engine starter motor only when the manual selector switch for the clutch-and-brake mechanism is in the brake position.

8 Claims, 2 Drawing Figures

PATENTED NOV 20 1973 3,773,156
Fig.1.
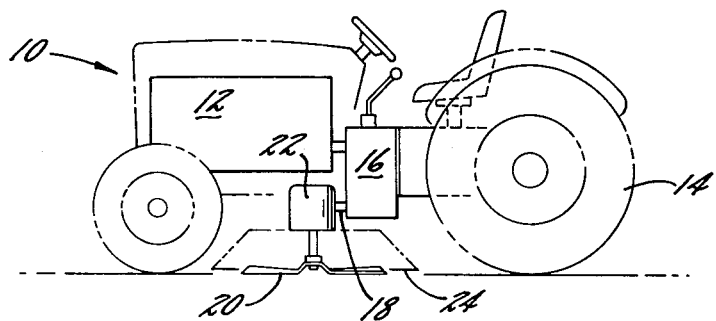
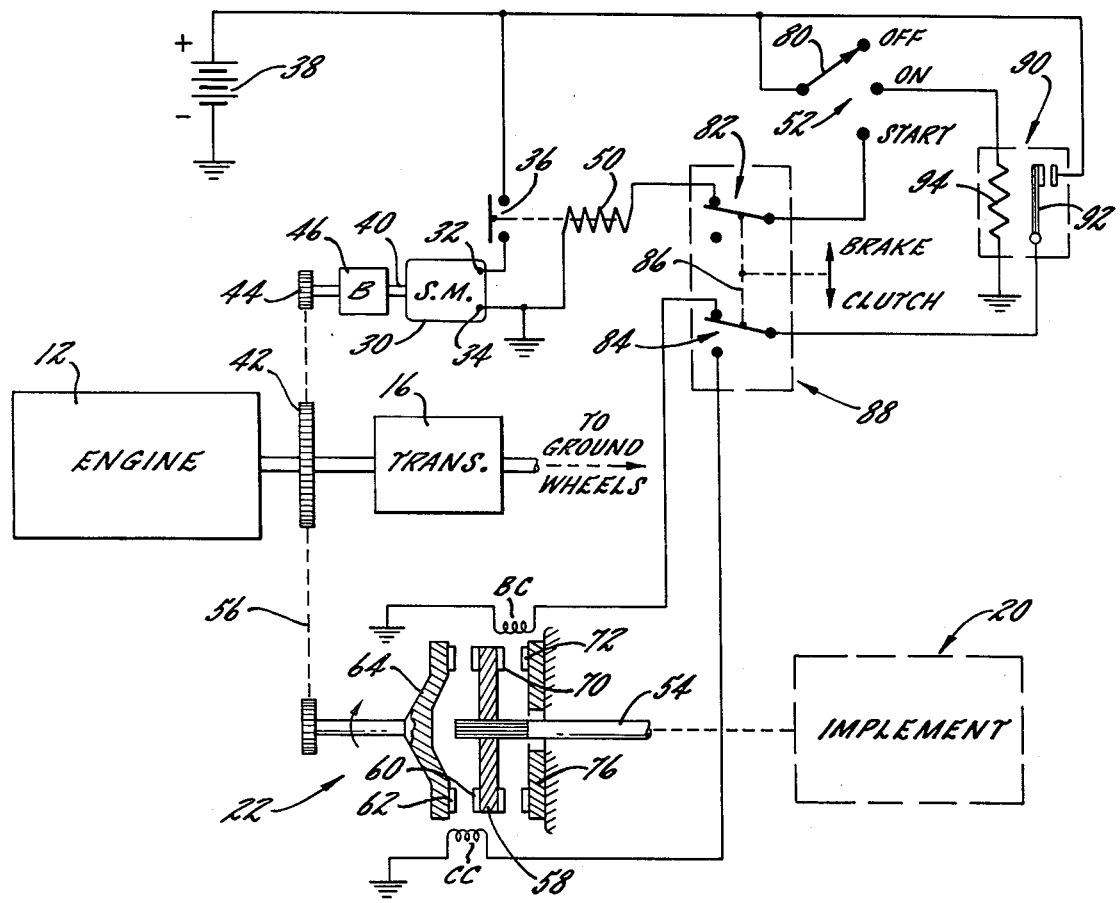
Fig.2.

CLUTCH-BRAKE AND MOTOR CIRCUIT FOR ENGINE-DRIVEN IMPLEMENTS

DESCRIPTION OF THE INVENTION

This invention relates generally to mechanisms for controlling an implement from the power take-off of a prime mover, and more particularly concerns control devices for electrically actuated clutch-brakes associated with tractor-mounted implements.

Farm, lawn and garden implements, such as mowers, power sweepers, aerators or the like are normally driven either directly from the power take-off of a gas or electric engine or through an externally controlled clutch which may also include a brake device. In particular, in large lawn and garden tools, as well as in commercial and farm equipment, it has become increasingly desirable to use an electrically controlled clutch-and-brake mechanism so as to provide control of the operating tool, a mower blade or the like, in a manner which is independent of the operating condition of the engine itself.

It is a general object of the present invention to make the use of the aforementioned power driven devices safer for the operator. More specifically, it is an object of the present invention to provide electrical interlocks which operate in conjunction with the ignition system of an engine to control an electrical clutch in such a manner that free-wheeling movement of the implement is prevented after operation of the engine has terminated.

The invention is particularly adapted for use with an electrically controllable clutch-and-brake mechanism capable of achieving a deenergized condition in which the implement is free-wheeling and an energized condition in which the implement is clutched to the engine or braked to a stop. In prior arrangements, energization of the clutch-and-brake mechanism is possible only during the operating period of the engine, so that as the engine is shut off, the implement is declutched, the inertia of rotation developed during the operating period causing the implement to be free-wheeling independent of the engine drive. This condition is, of course, dangerous in that the implement may be moving quietly at a high speed for several seconds or more after shutdown of the engine.

It is a further object of the invention to provide for a delay period after shutdown of the engine during which the implement is either clutched to the stopped engine or braked to a stop. It is a more specific object of the invention to provide for interlocking the electrical clutch control mentioned above with the ignition system of the engine through a time-delay switching device which temporarily holds the clutch-and-brake mechanism energized after the engine stops running—and in a manner such that run-down of the battery associated with the engine is prevented.

Still a further object of the invention is the provision of a control circuit for a clutch-and-brake mechanism of the aforementioned type in which initial start-up of the engine is prevented if the implement is clutched to the engine.

Other objects and advantages of the invention will become apparent upon reading the following detailed description and upon reference to the drawings in which:

FIG. 1 depicts a power-driven lawn or farm implement for which the control circuit of the present invention is particularly suitable, and FIG. 2 is a schematic diagram, partially in block form, of an implement control system constructed in accordance with the present invention.

While the invention has been shown and will be described in some detail with reference to a preferred and exemplary embodiment, it is to be understood that the invention is not limited to such detail. On the contrary, it is intended here to cover all alternatives, modifications and equivalents as may be included within the spirit and scope of the invention as defined by the appended claims.

Turning first to FIG. 1, there is shown a vehicle 10 in the form of a lawn or garden tractor having an engine 12 from which the rear ground wheels 14 are driven through a transmission 16. A power take-off 18 from the transmission 16 provides a source of mechanical drive to an implement 20 in a manner selectively controlled by a clutch-and-brake mechanism 22. The implement 20 is shown as a rotary blade for cutting grass, weeds or the like; however, it will be understood that the invention described herein is applicable to any engine driven implement, such as a rotary tiller, snow blower, sickle bar mower, rotary or reciprocating rake or the like. While the prime mover is typically an internal combustion engine, it will be appreciated that certain features of the invention are equally applicable to other prime movers, such as electric motors, diesel or turbine engines.

A shroud 24 is normally provided to protect the operator from injurious contact with the implement 20. However, in most instances the shroud will additionally be effective to shield the implement 20 from the operator's vision so that the operator is unable to determine whether the operation of the implement 20 has ceased after shutdown of the engine 12. In his attempts to service or inspect the implement 20, the operator, thinking that the implement is motionless, might insert a hand or foot beneath the shroud 24 and into the path of the free-wheeling implement 20. The apparatus hereinafter described is provided to eliminate this possibility and to avoid other dangerous conditions which might exist as a result of the free-wheeling motion or unexpected start-up motion.

Turning now to FIG. 2, there are shown the basic elements of the power-driven implement shown in FIG. 1 along with the circuit for controlling the operation of the vehicle and the implement driven thereby. Those elements of FIG. 2 which are duplicated from FIG. 1 have reference numerals identical to those in FIG. 1.

In addition to the engine 12, transmission 16 and implement 20, there is shown an electric starter motor 30 which is actuated by the presence of an energizing voltage across its input terminals 32 and 34, the latter being connected to ground. The input terminal 32 is selectively connected through relay contacts 36 to an auxiliary electrical power source in the form of a dc. battery 38. An output shaft 40 of the starter motor 30 drives a flywheel 42 of the engine 12 via a mechanical connection which includes a gear 44 driven by a Bendix unit 46 which operates in a manner well known to those skilled in the art. During operation of the starter motor 30 the output shaft 40 is mechanically coupled to crank the flywheel 42 until the engine 12 starts, after which the engine 12 operates independently of the starter motor 30 due to the mechanical isolation provided by the Bendix unit 46. The relay contacts 36 controlling the starter motor 30 are normally open and are actuated by energizing an associated coil 50 connected to ground potential at one end and having its other end normally coupled to the START contact of a manual ignition selector 52 in a manner hereafter described.

The implement 20 has an input shaft 54 which is driven through the clutch-and-brake mechanism 22 from the engine 12 via a mechanical connection 56. The connection 56 may include step-up or step-down gearing as is appropriate for driving the chosen implement 20. The clutch-and-brake mechanism 22 is here diagrammatically illustrated and includes brake means selectively energizable to brake the operating movement of the implement and clutch means selectively energizable to couple the mechanical output drive of the engine 12 to operate the implement 20. For this purpose, a drive plate 58 is splined for axial, but not rotational, movement relative to the shaft 54 of the implement 20. The forward face of the drive plate 58 carries a clutch ring 60 which cooperate with an opposing ring 62 fixed to a rotating member 64 which is continuously driven by the engine 12. Engagement between the clutch rings 60 and 62 is effected through selective energization of a clutch solenoid or coil CC which causes the drive plate 58 to move forward (left) along the shaft 54 into engagement with the member 64.

On the right or rear side of the drive plate 58 a brake ring 70 is fixed to cooperate with friction ring 72 permanently attached to the vehicle chassis through a heat-dissipating spacer 76. Actuation of the brake function is controlled by the brake solenoid or coil BC which, when energized, causes the drive plate 58 to move rearward (right) to engage the rings 70 and 72 so as to brake the movement of the shaft 54. The drive plate 58 is normally biased to a central position by springs (not shown), and when the clutch-and-brake mechanism 22 is deenergized, the drive plate 58 may rotate between and independently of clutch ring 62 and brake ring 72 so as to render the implement 20 freewheeling.

For alternatively placing the prime mover or engine 12 in the ON, START and OFF conditions, there is provided a manual control in the form of the ignition switch 52 depicted as a pivoted contact arms 80 having first, second and third positions (clockwise) designated respectively OFF, ON and START. In its first position the switch 52 is open. In its third position the switch 52 is operable to connect the power source 38 to the starter motor relay 36 through a start control means in the form of a switch 82. In accordance with normal practice, the conventional ignition system (not shown) for sustaining spark to the engine and power to accessories is energized through the ON position of the ignition switch 52, and the contact arm 80 is spring biased away from the START position toward the ON position by means not shown. To provide for a selectable control over energization of the brake coil BC or clutch coil CC, there is provided function selector means in the form of a single pole-double throw switch 84 having first (BRAKE) and second (CLUTCH) conditions or positions for alternatively enabling the power supply 38 to be connected to the brake and clutch coil respectively. The switch 84 is ganged to the switch 82 by an internal mechanical connection 86 to complete a double pole-throw switching device 88 which operates in such a way that operation of the starting motor 30 is enabled only when the switching device 88 is in its BRAKE condition to insure that the implement is not clutched to the engine 12 immediately after engine starting when the ignition switch is returned to the ON position.

As described thus far, the control circuit could be made to control the clutch-and-brake mechanism 22 by simply connecting the common terminal of the selector switch 84 to the power supply 38. Such a direct connection would, however, cause power to be drained from the supply 38 at all times or, in the case of a battery-type supply, cause run-down of the battery when the engine is OFF for several hours or days. Run-down of the battery can be avoided by the known expedient of connecting the common terminal of the selector switch 84 to the power supply 38 through ON terminal of the ignition switch 52. However, such an arrangement would not prevent free-wheeling of the implement 20 after the engine is turned off. Returning the switch 52 to the OFF condition would leave both the brake coil BC and clutch coil CC in a de-energized state. If the implement 20 had previously been clutched to the engine and put into motion, such motion would continue after the engine 12 had stopped until rotational friction could bring the implement to a halt. This might take several seconds or even minutes, depending on the bearing quality and weight distribution of the implement 20, during which time the implement 20 would pose a danger to anyone who, thinking the blade stopped, placed a hand or foot in close proximity.

In accordance with the present invention, there are provided two levels of control for determining the energization of the clutch-and-brake mechanism from the power source, the first level of control being provided by the selector switch 84 and the second level of control being provided by suitable time delay switching means, such as a delayed dropout relay or, as here shown, a thermal time delay switching device 90, which maintains connection of power to the switch 84 from the power source 38 during the normal ON condition of the engine 12. Due to the time delay characteristic, however, the device 90 continues energization of the selected one of the brake BC or clutch CC coils for a predetermined delay interval after the engine is shut down.

The switching device 90 is associated with the ignition switch 52 to enable and disable energization of the selected one of the brake or clutch for periods corresponding substantially to the ON and OFF conditions respectively of the engine 12, but the time delay feature of the switching device 90 delays disabling the selected brake or clutch functions for a predetermined interval after the engine is shut down. As a result, the free-wheeling movement of the implement 20 is automatically brought to a halt after the engine is turned off, since the implement is either braked to a halt or held clutched to the engine as the latter comes to a stop.

To accomplish these objectives, the switching device 90 includes a normally open thermally responsive switch 92, for example, one with a bi-metal switch arm, connected directly between the common pole of the switch 84 and the power supply 38. Also included in the time delay means is a resistive heating element 94 connected between ground potential and the ON terminal of the ignition switch 52. Because of its proximity with the thermal switch 92, the heating element 94, when rendered conductive, generates sufficient heat to close the thermal switch 92 so as to enable energization of either the brake coil BC or the clutch coil CC through the switch 84.

The time delay aspect of the switch 90 results from the fact that a finite amount of time, typically ten seconds or more, is required for heat dissipation in the device 90, and hence there is a delay between the cessation of conduction through the heating element 94 and the opening of the switch 92. This delay occurs after the engine 12 is turned off and prevents the implement 20 from assuming the free-wheeling condition (with the driving plate 58 centered) until after it has been brought to a complete stop either by braking or clutching to the stopped engine.

The operation of the control circuit will be more readily appreciated from the following description of a typical operating sequence. The single-pole double-throw switches 82 and 84 must be in their upper or BRAKE position before the engine can be started. As noted above, these switches are ganged together to prevent operation of the starter motor 30 so long as the switch assembly 88 is in its CLUTCH position. This means that immediately after the engine starts and the ignition switch 52 is released to the ON position, the brake coil BC will be energized to prevent the unexpected, immediate motion of the implement or blade 20.

When the ignition switch 52 is turned to the START position, current begins to flow from the power source 38 through the switch 82 and the coil 50 of the starter motor relay 36, but only if the switch 88 is then in the BRAKE position. The normally open contacts of the relay 36 close to provide an input signal to the starter motor 30 so as to start the engine 12. When the engine is started, the operator releases the ignition switch 52 so that it returns to the ON position by virtue of its spring bias. Current starts to flow through the heating element 94 from the power source 38, and the temperature within the switching device 90 increases rapidly, causing the switch 92 to close so as to provide energizing current to the brake coil BC of the clutch-and-brake mechanism 22. The operator may then move the switching device 88 to the lower or CLUTCH position, in which current is directed through and energizes the clutch coil CC to cause advancement of the drive plate 58 along the shaft 54 of the implement 20 into engagement with the engine driven member 64. The implement is thereafter driven in the normal manner under power from the engine 12, and the operator may affirmatively and quickly actuate or deactuate the implement 20 by shifting the selector 88 to its CLUTCH or BRAKE positions.

Before shutting off the engine and terminating the operation of the tractor, a prudent operator should move the selector 88 to its BRAKE position, thereby to energize the brake coil BC and stop the implement or blade 20. But operators are often forgetful, and the present control makes it impossible to have the implement "free wheel" under any condition of the selector 88 at the time the engine is shut off. When the operator desires to stop the engine 12, he returns the ignition switch 52 to the OFF condition, opening the circuit between the power source 38 and the heating element 94 of the switching device 90. The engine 12 stops as its spark control circuit (not shown) is opened by movement of the ignition switch 52 to the OFF position. For a predetermined delay interval, however, conduction through the thermal switch 92 of the switching device 90 continues as the heat built up in the element 94 is dissipated. If the selector 88 and its switch 84 are in their lower position during this period, the implement 20 is clutched to the stopped engine shaft and therefore must stop its rotation. If the selector 88 and its switch 84 are in their upper position, the implement 20 is automatically braked through continued energization of the brake coil BC. In either case, the danger inherent in a silently moving, free-wheeling implement blade is alleviated. After a period of time sufficient to stop the implement 20, the heat in the time delay switching device 90 dissipates sufficiently to allow the thermal switch 92 to open, causing deenegization of the then-selected one of the brake or clutch coils, —and this removes the coil-energizing current drain from the battery 38, so that the latter is not harmfully discharged and run down.

From the foregoing it should be apparent that there has bee brought to the art a system of control for engine-driven implements which provides a degree of protection for the operator and others in the vicinity which has heretofore been unattained in the art. The control system described above provides dual advantageous functions. First, it prevents the operator from starting the engine while acting under the erroneous assumption that the implement will initially be disengaged from the engine, eliminating the possibility that the implement, a mower blade or the like, would immediately start turning. The operator must affirmatively engage the clutch after he starts up the engine. Secondly, it continues energization of either the brake coil or the clutch coil for a suitable delay period (e.g., about 10 or 15 seconds) after the engine is turned off, the result being that the implement is either braked to a stopped condition or brought to a stopped condition by the engine through the clutch. The time delay device here described allows the clutch-and-brake mechanism to be supplied with energy after the engine is turned off (and after the ignition switch 52 has been moved from the ON to the OFF position), and yet in a manner such that continued current drain and run-down of the battery is avoided, while precluding dangerous free-wheeling of an implement no matter how forgetful the operator may be in setting the brake-clutch selector switch 88.

I claim:

1. In combination:
   a prime mover for providing a mechanical output drive,
   a selectable control means for alternatively placing said prime mover in the on or off condition,
   a mechanically drivable implement,
   clutch means selectively engageable to couple said mechanical output drive to operate said implement,
   brake means selectively engageable to brake the operation of said implement,
   an auxiliary energy source,
   clutch-brake selector means for controlling the flow of energy from said energy source to engage said clutch or brake means alternatively, and
   time delay means between said energy source and said selector means for maintaining the energy flow to the selected one of said clutch or brake means during the normal on condition of said prime mover and for a predetermined interval after the prime mover is placed in the off condition by said control means to insure that the operating motion of said implement is either braked or clutched to a stopped condition when the prime mover is rendered inoperative.

2. In combination:
a prime mover for providing a mechanical output drive,
selectable control means for alternatively placing said prime mover in the on or off condition,
a mechanically drivable implement,
clutch means selectively energizable to couple said mechanical output drive to operate said implement,
brake means selectively energizable to brake the operation of said implement,
an auxiliary energy source,
time delay switch means controlled by said control means to be conductive during the normal on condition of the prime mover and non-conductive during a period delayed from but corresponding in duration to the duration of the off condition of said prime mover,
a brake-clutch selector means coupled to said energy source through said switch means for energizing the selected one of said brake or clutch means during the conduction periods of said switch means,
the delay of said switch means being sufficient to allow said implement to be clutched or braked to a stop after said prime mover is placed in the off condition.

3. In combination:
a prime mover for providing a mechanical output drive,
selectable control means for alternatively placing said prime mover in the on or off condition,
a mechanically drivable implement,
clutch means selectively engageable to couple said mechanical output drive to operate said implement,
brake means selectively engageable to brake the operation of said implement,
selector means for alternatively engaging either said clutch or brake means, and
selector inhibiting means controlled by said selectable control means for allowing and inhibiting engagement of said selected brake or clutch means for periods corresponding substantially to the on and off conditions respectively of said prime mover, said selector inhibiting means including a time delay device for maintaining engagement of the selected one of said brake or clutch means for a predetermined interval after said prime mover is rendered inoperative so that the operating motion of said implement terminates after operation of said prime mover ceases.

4. In combination with an engine for providing a mechanical drive, a starter motor for said engine, and an implement adapted to be driven by said engine,
manual control means for alternatively placing said engine in the ON, START and OFF conditions,
clutch means selectively engageable to couple said mechanical output drive to operate said implement,
brake means selectively engageable to brake the operation of said implement,
selector means having first and second conditions for alternatively engaging either said brake or said clutch means,
starter control means operatively associated with said selector means and said manual control means for enabling operation of said starter motor by said manual control means only when said selector means is in said first condition to insure that said implement is not clutched to said engine during starting, and
selector inhibit means associated with said manual control means and operative to enable and disable engagement of the selected one of said brake or clutch means for periods corresponding substantially to the ON and OFF conditions respectively of said engine, said selector inhibit means further including a time delay device for delaying the disabling of the selected one of said brake or clutch means for a predetermined interval after said engine is placed in the OFF condition.

5. In combination with an engine for providing a mechanical drive, an implement adapted to be driven by said engine and an electrically controllable clutch-and-brake mechanism capable of achieving a deenergized condition in which the implement is free-wheeling and first and second energized conditions for respectively clutching said implement to said engine and braking the movement of said implement,
a control circuit for preventing free-wheeling movement of said implement after operation of said engine has terminated including
a. an electrical power source,
b. first and second switching means controlling energization of said clutch-and-brake mechanism from said power source, said first switching means being selectively positionable to provide a choice between clutching or braking of said implement and said second switching means being operatively associated with said engine for enabling and disabling the energization of said brake and clutch mechanism by said power source during periods substantially corresponding to the operative and inoperative conditions, respectively, of said engine, and
c. time delay means associated with said second switching means for maintaining said brake and clutch mechanism in one of said energized conditions for a predetermined delay interval after said engine is rendered inoperative.

6. The combination according to claim 5 further including engine control means for placing said engine in the on or off condition, said second switching means including a normally open thermal switch in series with said power source and said brake-and-clutch mechanism.

7. The combination according to claim 6 wherein said time delay means is a resistive heating element in proximity with said thermal switch and rendered conductive whenever said engine is placed in the on condition and non-conductive whenever said engine is placed in the off condition by said control means.

8. The combination according to claim 5 wherein said brake and clutch mechanism includes a brake coil and a clutch coil and wherein said first switching means is a single pole-double throw switch disposed between said thermal switch and said brake and clutch coils and having a first position for allowing electrical energization of said clutch coil and a second position for allowing electrical energization of said brake coil.

* * * * *